United States Patent
Tsuji et al.

(10) Patent No.: US 10,650,183 B2
(45) Date of Patent: May 12, 2020

(54) DISPLAY CONTROL APPARATUS FOR DISPLAYING EXAGGERATEDLY, PRINTING APPARATUS FOR DISPLAYING EXAGGERATEDLY, CONTROL METHOD OF DISPLAY CONTROL APPARATUS, AND PROGRAM THEREFOR

(71) Applicant: SEIKO EPSON CORPORATION, Tokyo (JP)

(72) Inventors: Akinori Tsuji, Shiojiri (JP); Mikihiro Kajihara, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/018,176

(22) Filed: Jun. 26, 2018

(65) Prior Publication Data
US 2019/0005002 A1    Jan. 3, 2019

(30) Foreign Application Priority Data
Jun. 28, 2017 (JP) ................................. 2017-126642

(51) Int. Cl.
| G06F 17/21 | (2006.01) |
| G06F 40/106 | (2020.01) |
| B41J 3/407 | (2006.01) |
| G06F 3/12 | (2006.01) |
| G06F 3/14 | (2006.01) |
| G06F 40/166 | (2020.01) |

(52) U.S. Cl.
CPC .......... *G06F 40/106* (2020.01); *B41J 3/4075* (2013.01); *G06F 3/1208* (2013.01); *G06F 3/1256* (2013.01); *G06F 3/14* (2013.01); *G06F 40/166* (2020.01); *G06F 3/1205* (2013.01); *G06F 3/1251* (2013.01); *G09G 2340/0464* (2013.01); *G09G 2340/145* (2013.01)

(58) Field of Classification Search
None
See application file for complete search history.

(56) References Cited

U.S. PATENT DOCUMENTS

| 2005/0073720 A1 | 4/2005 | Kajihara et al. |
| 2009/0106649 A1 | 4/2009 | Nose |
| 2015/0092228 A1* | 4/2015 | Okabayashi ......... G03G 15/502 358/1.15 |
| 2018/0307449 A1* | 10/2018 | Tsuji ................... H04N 1/0044 |

FOREIGN PATENT DOCUMENTS

| JP | 2009-093245 A | 4/2009 |
| JP | 2010-224703 A | 10/2010 |
| WO | WO-2017/061083 A1 | 4/2017 |

OTHER PUBLICATIONS

Extended European Search Report dated Nov. 9, 2018 in related European Appl. 18180240.6 (8 pages).

* cited by examiner

*Primary Examiner* — Andrew H Lam
(74) *Attorney, Agent, or Firm* — Foley & Lardner LLP

(57) ABSTRACT

A display control apparatus exaggeratedly displays a change in a printing image based on an alteration in a setting value of an editing item, on a display, when editing results of printing data on an editing screen are displayed on the display as the printing image and the setting value of the editing item of the printing data is altered.

9 Claims, 14 Drawing Sheets

FIG. 4

| EDITING ITEM | SETTING VALUE | | | ALTERATION UNIT [mm] |
|---|---|---|---|---|
| | LOWER LIMIT VALUE [mm] | UPPER LIMIT VALUE [mm] | DEFAULT VALUE [mm] | |
| MARGIN LENGTH | 1.0 | 15.0 | 3.0 | 1.0 |
| LABEL LENGTH | 205.0 | 208.0 | 206.0 | 0.1 |

DISPLAY CONTROL APPARATUS FOR DISPLAYING EXAGGERATEDLY, PRINTING APPARATUS FOR DISPLAYING EXAGGERATEDLY, CONTROL METHOD OF DISPLAY CONTROL APPARATUS, AND PROGRAM THEREFOR

BACKGROUND

1. Technical Field

The present invention relates to a display control apparatus, a printing apparatus, a control method of display control apparatus, and a program that display an printing image corresponding to printing data.

2. Related Art

A label printing system capable of editing printing data for creating a label and capable of displaying a printing image corresponding to the printing data is known in the related art (for example, JP-A-2009-93245).

However, in the label printing system, for example, in a case where a length (hereinafter, referred to as a "margin length") of a margin provided at a front end portion and a rear end portion of the label and a label length are altered as editing of the printing data, a user may not be aware of the change in the printing image, with an alternation of a few millimeters. Particularly, in a case where the label length is long, or in a case where a display region for displaying the printing image is narrow, the change in the printing image due to the alteration in the setting value such as a margin length or the label length is small, and thus, there is a problem that a user hardly confirms which part of the printing image is reflected by the change in the setting value (which part of the printing image is changed or how much is the change?).

In the same manner, even in a case where character decoration is performed as editing of printing data, the user may not be aware of the change in the printing image. Particularly, in a case where a font size is small, or in a case where the display region is narrow, the change in the printing image due to an alteration in the decoration is reduced, and thus, there is a problem that the user hardly confirms how the change in the decoration is reflected in the printing image.

SUMMARY

An advantage of some aspects of the invention is to provide a display control apparatus, a printing apparatus, a control method of a display control apparatus, and a program that can show a user in an easy-to-understand manner how a change is reflected in a printing image in a case where a setting value of an editing item is altered by a user.

According to an aspect of the invention, a display control apparatus includes a control unit that exaggeratedly displays a change in a printing image based on an alteration in a setting value of an editing item, on a display, when editing results of printing data on an editing screen are displayed on the display as the printing image and the setting value of the editing item of the printing data is altered.

According to another aspect of the invention, a printing apparatus includes a display that displays editing results of printing data on an editing screen of the printing data as a printing image; a control unit that exaggeratedly displays a change in the printing image based on an alteration in a setting value of an editing item on the display, when the setting value of the editing item of the printing data is altered; and a printing unit that performs printing on a printing medium, based on the printing data.

According to a still another aspect of the invention, a control method of a display control apparatus includes exaggeratedly displaying a change in a printing image based on an alteration in a setting value of an editing item, on a display, when editing results of printing data on an editing screen are displayed on the display as the printing image and the setting value of the editing item of the printing data is altered.

According to a still another aspect of the invention, a program causes a computer to perform the control method of the display control apparatus described above.

In the configuration, a change in a printing image based on an alteration in a setting value of an editing item of printing data is exaggeratedly displayed on a display, and thus, a user can easily view how the change in the setting value is reflected in the printing image.

The printing data includes various control signals (cut command, and the like) relating to printing in addition to image data indicating the printing image to be printed on a printing medium.

In addition, the printing image may be an image (printing preview display) which superimposes and displays the printing image on an image of the printing medium or may be an image which displays only the printing image.

In display control apparatus, the control unit may display the printing image in a preview display region of the editing screen that is displayed on the display.

In the configuration, it is possible for a user to clearly view how an alteration in a setting value is reflected in a printing image, in a preview display region of an editing screen.

In display control apparatus, the printing data may be used for performing printing on a long printing medium, and, in the editing item, a length of the printing image in a longitudinal direction of the printing medium may be changed due to the alteration in the setting value.

In the configuration, for example, in a case where margin lengths of a front end portion and a rear end portion of a printing medium and a length of the printing medium in a longitudinal direction are altered, it is possible for a user to clearly see how the alteration is reflected in the printing image.

In display control apparatus, in the editing item, a character decoration of the printing image may be changed due to the alteration in the setting value.

In the configuration, in a case where a character decoration is altered, it is possible for a user to clearly view how the alteration is reflected in a printing image.

In display control apparatus, the control unit may exaggeratedly display the change in the printing image, according to an altered value of the setting value, in a case where the altered value of the setting value from a default value or a previous setting value of the editing item is less than or equal to a threshold value, and may display the printing image when the setting value is set to the threshold value, in a case where the altered value exceeds the threshold value.

In the configuration, In a case where an altered value of the setting value is less than or equal to a threshold value, a user is hardly aware of the change, and thus, by exaggeratedly displaying a change in a printing image in accordance with the altered value of the setting value, it is possible for a user to clearly view how the alteration of the setting value is reflected in the printing image. Meanwhile, in a case where the altered value of the setting value exceeds the threshold value, it is possible to prevent the printing image and printing results from becoming far apart from each other by displaying the printing image when the setting value is set to the threshold value.

In display control apparatus, there may be a plurality of the editing items, an alteration unit of the setting value may be determined for each editing item, and the threshold value may be determined by the same number of alteration steps for the plurality of editing items.

In the configuration, an alteration unit of a setting value is determined for each editing item, and thereby, a user can perform editing by an alteration unit appropriate for each editing item. In addition, since a threshold value is determined by the same number of alteration steps for a plurality of editing items, the user understands that the altered place is exaggeratedly displayed in a case where the setting value is altered to some extent, thereby, confirming the printing image.

BRIEF DESCRIPTION OF THE DRAWINGS

The invention will be described with reference to the accompanying drawings, wherein like numbers reference like elements.

FIG. 4 is a diagram illustrating an example of setting values and alteration units of edition items "margin length" and "label length".

FIG. 7 is a diagram illustrating a change in a printing image due to an alteration in the margin length.

FIG. 10 is a diagram illustrating a change in the printing image due to an alteration in the label length.

FIG. 11 is a diagram illustrating the change in the printing image due to the alteration in the label length subsequent from FIG. 10.

DESCRIPTION OF EXEMPLARY EMBODIMENTS

Hereinafter, a display control apparatus, a printing apparatus, a control method of the display control apparatus, and a program according to the invention will be described with reference to the accompanying drawings. In the present embodiment, a personal computer (hereinafter, referred to as "PC") is exemplified as the "display control apparatus".

Figure 1:
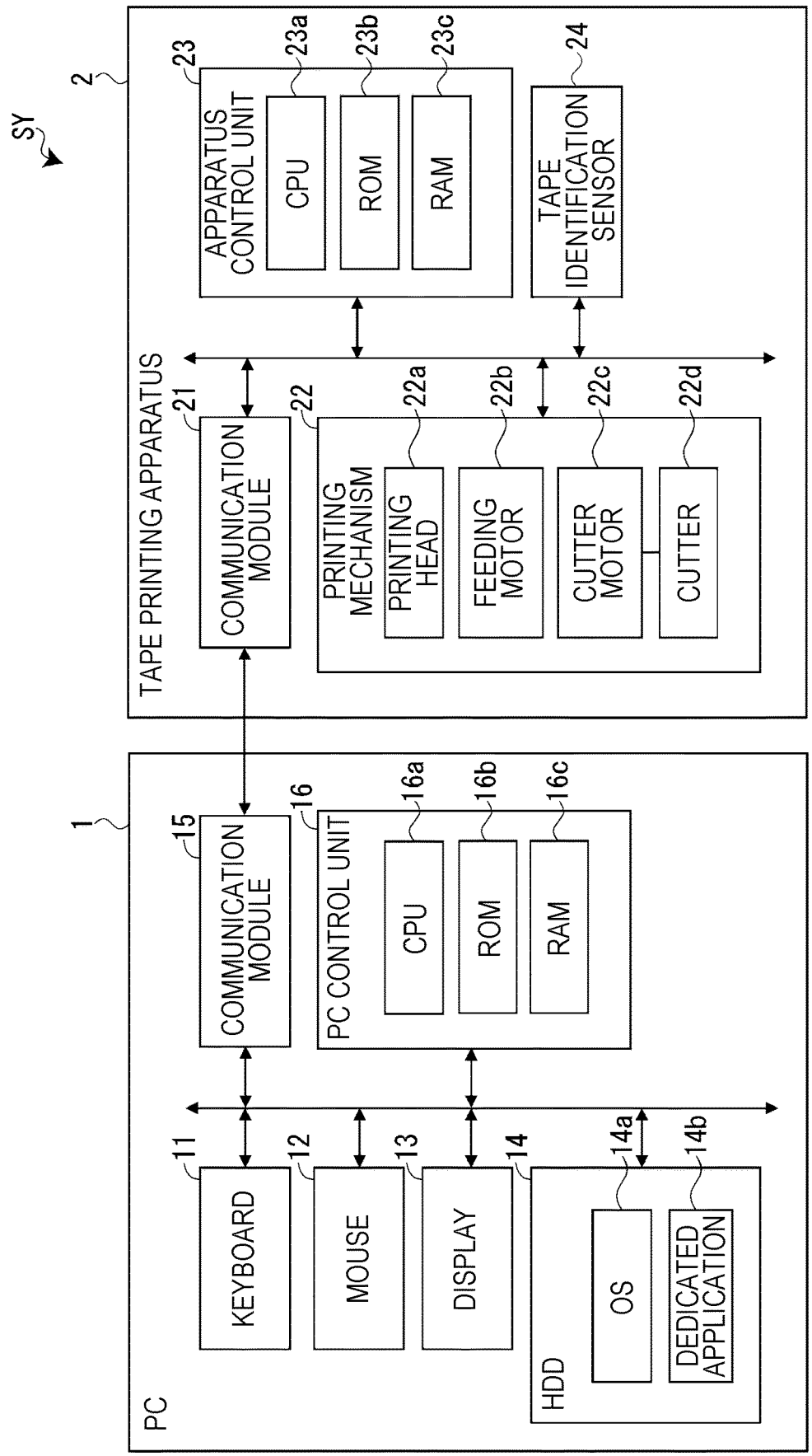
FIG. 1 is a block diagram illustrating a hardware configuration of a printing system according to an embodiment of the invention.

FIG. 1 is a block diagram illustrating a hardware configuration of a printing system SY according to an embodiment of the invention. The printing system SY includes a PC1 and a tape printing apparatus 2. The PC1 and the tape printing apparatus 2 are connected via a cable or wireless communication. A connection form may be a network connection or a one-to-one connection.

Figure 3:
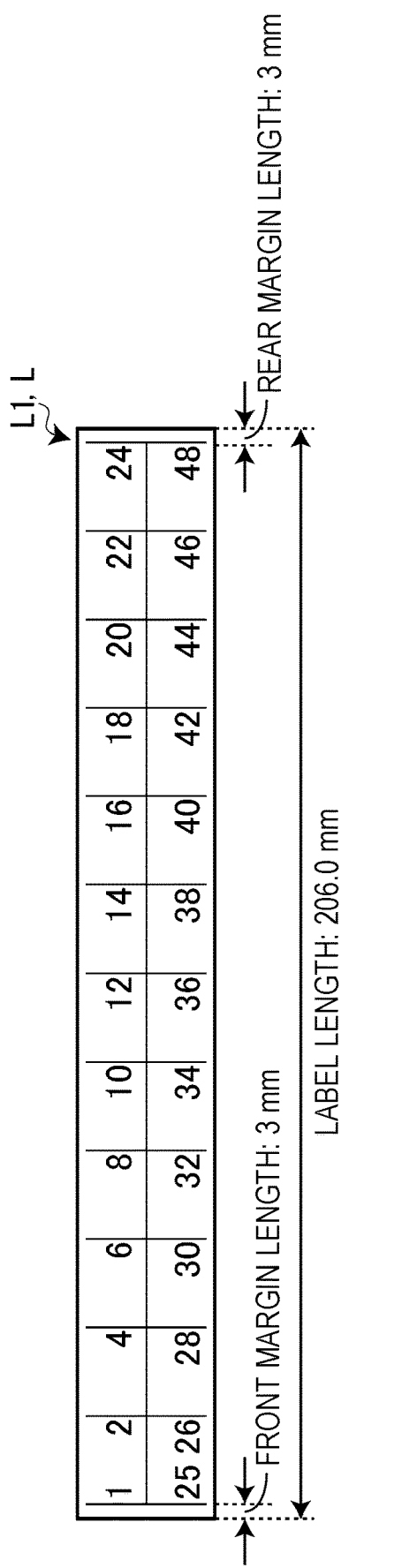
FIG. 3 is a diagram illustrating a creation example of a punch block label.

The PC1 generates printing data for creating a label L (see FIG. 3). In addition, the tape printing apparatus 2 performs printing on a tape which is an example of a long printing medium, based on the printing data transmitted from the PC1, and creates the label L.

The PC1 includes a keyboard 11, a mouse 12, a display 13, a hard disk drive (HDD) 14, a communication module 15, and a PC control unit 16 as a hardware configuration. The PC control unit 16 is an example of a "control unit".

The keyboard 11 and the mouse 12 are used as operation means for a user to perform various operations. In addition, the display 13 is used as display means for displaying various types of information such as an editing screen D1 (see FIG. 2 and the like). The editing screen D1 is used for editing printing data.

The HDD 14 is an auxiliary storage device, and stores an operating system (OS) 14a, a dedicated application 14b (referred to as "dedicated application" in FIG. 1), and the like. The dedicated application 14b creates the label L in cooperation with the tape printing apparatus 2.

The communication module 15 communicates with the tape printing apparatus 2 and is mainly used for transmission of printing data to the tape printing apparatus 2 and reception of tape information which will be described below, in the present embodiment.

The PC control unit 16 includes a central processing unit (CPU) 16a, a read only memory (ROM) 16b, and a random access memory (RAM) 16c. The CPU 16a inputs and outputs signals from and to each unit in the PC1 and performs various types of arithmetic processing. The ROM 16b stores various control programs and various control data. The RAM 16c is used as a work area of the CPU 16a.

In addition, the PC control unit 16 realizes display processing, printing data generation processing, printing command processing, and the like, based on the dedicated application 14b.

Figure 2:
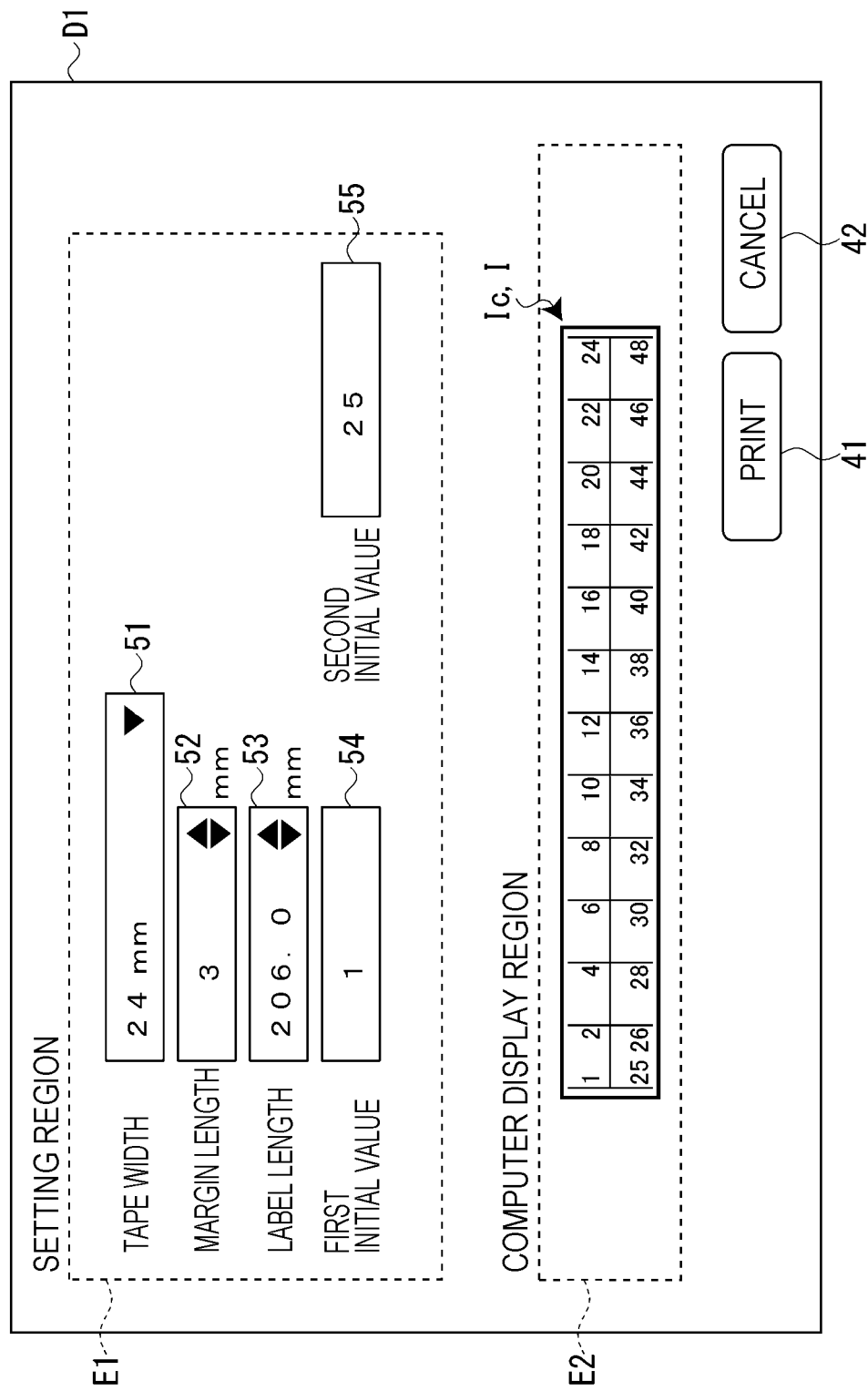
FIG. 2 is a diagram illustrating an example of an editing screen (when a margin length is set to 3 [mm] and a label length is set to 206.0 [mm]).

For example, the CPU 16a causes the display 13 to display the edited results as a printing image I in accordance with an edition operation of the printing data on the editing screen D1 (see FIG. 2), as display processing (see the preview display region E2 of FIG. 2). At this time, if a setting value of a predetermined edition item ("margin length", "label length", and the like) among the edition items of the printing data is altered, the CPU 16a exaggerates the change of the printing image I based on the alteration of the setting value to display. Details will be described below.

The CPU 16a generates printing data for creating the label L, based on the edition results of the printing data on the editing screen D1, as the printing data generation processing. In the present embodiment, the printing data includes various control signals such as a tape cutting command in addition to the image data indicating a printing image to be printed on a tape.

The CPU 16a transmits the printing data generated through the printing data generation processing to the tape printing apparatus 2, based on an printing instruction operation (selection of ae print button 41, see FIG. 2) on the editing screen D1, as the printing command processing.

Meanwhile, the tape printing apparatus 2 includes a communication module 21, a printing mechanism 22, an apparatus control unit 23, and a tape identification sensor 24, as a hardware configuration. The printing mechanism 22 is an example of a "printing unit".

The communication module 21 communicates with the PC1 and is used for reception of printing data, transmission of tape information, and the like.

The printing mechanism 22 performs printing, based on the printing data received from the PC1, and includes a printing head 22*a*, a feeding motor 22*b*, a cutter motor 22*c*, and a cutter 22*d*. The printing head 22*a* faces a feeding path from a tape storage unit for storing a tape to a discharge unit for discharging the tape and performs printing on the tape which is fed. The feeding motor 22*b* is a drive source that feeds tape along a feeding path. The cutter motor 22*c* is a drive source that drives the cutter 22*d*. After printing is ended, the cutter 22*d* cuts a printed portion of the tape in a width direction. As such, a strip-shaped label L is created by cutting the tape.

The apparatus control unit 23 includes a CPU 23*a*, a ROM 23*b*, and a RAM 23*c*. The CPU 23*a* inputs and outputs signals from and to each unit in the tape printing apparatus 2 and performs various types of arithmetic processing. The ROM 23*b* stores a control program such as a firmware and various control data. The RAM 23*c* is used as a work area of the CPU 23*a*.

The tape identification sensor 24 detects tape information such as a tape width and a tape color of the tape. For example, in a case where a tape cartridge containing a tape is mounted on the tape printing apparatus 2, tape information may be detected by using a method of reading an image (a bar code, a two-dimensional code, or the like) attached to or printed on the tape cartridge, and a radio frequency identification (RFID), a method of detecting whether or not there is one or more holes formed in the tape cartridge, and the like. Alternatively, the tape width of the tape may be directly detected by an infrared sensor or the like.

The apparatus control unit 23 transmits the tape information detected by the tape identification sensor 24 to the PC1. Transmission timing of the tape information may be, for example, the time when the tape printing apparatus 2 is activated, the time when the tape is replaced, and the like. In addition, when an information acquisition command is received from the PC1, the tape information may be transmitted as a response to the information acquisition command. The PC1 may transmit an information acquisition command when the dedicated application 14*b* is activated, or when a predetermined operation is performed for the dedicated application 14*b*.

Next, the editing screen D1 will be described with reference to FIG. 2. Here, an editing screen D1 for creating a punch block label L1 (see FIG. 3) that displays port numbers of a wiring board is exemplified. The editing screen D1 includes a setting region E1, a preview display region E2, a print button 41, and a cancel button 42. In FIG. 2, frame lines of the setting region E1 and the preview display region E2 are denoted by dashed lines, but the fame lines may be denoted by solid lines or may not be displayed. However, since the preview display region E2 denotes a limited region, it is preferable that the preview display region E2 be displayed to be distinguishable from other regions in the editing screen D1 (for example, a ground color of the preview display region E2 is different from a ground color of the editing screen D1).

The setting region E1 displays a tape width display and selection field 51, a margin length setting field 52, a label length setting field 53, a first initial value setting field 54, and a second initial value setting field 55.

The tape width display and selection field 51 displays a tape width transmitted from the tape printing apparatus 2 as tape information. In addition, it is also possible for a user to alter the tape width to a certain tape width in the tape width display and selection field 51. In this case, the user contains a tape (or tape cartridge) with the altered tape width in a tape storage unit of the tape printing apparatus 2.

In the margin length setting field 52, a margin length, which is a length of the tape in a longitudinal direction, of a margin provided at a front end portion and a rear end portion of the label L is set. The margin length is set by increasing or decreasing a numerical value according to selection of an upward triangular mark and a downward triangular mark provided in the margin length setting field 52 or by directly inputting a numerical value. However, in a case where the numerical value is input, there is an input limit (limit of a lower limit value and an upper limit value, an input limit of a one decimal place or less, and the like, see FIG. 4). In the present embodiment, a front margin length provided at the front end portion of the label L and a rear margin length provided at the rear end portion of the label L are set as the same length (see FIG. 3), but the margin lengths may be able to be independently set.

In the label length setting field 53, a label length which is a length in the longitudinal direction of the tape is set. The label length is set by increasing or decreasing a numerical value according to selection of the upward triangular mark and the downward triangular mark provided in the label length setting field 53, or by directly inputting the numerical value. However, in a case where the numerical value is input, there is an input limit (limit of a lower limit value and an upper limit value, an input limit of a two-decimal place, and the like, see FIG. 4).

In an example of FIG. 2, the margin length setting field 52 and the label length setting field 53 each illustrate a state in which default values (margin length: 3 [mm], label length: 206.0 [mm]) are set. That is, when the editing screen D1 is open, these values are previously input as initial values in the margin length setting field 52 and the label length setting field 53.

An initial value of an upper stage of the punch block label L1 is set in the first initial value setting field 54. Total 13 numeral values of an initial value, the initial value+1, the initial value+3, the initial value+5, the initial value+7, the initial value+9, the initial value+11, the initial value+13, the initial value+15, the initial value+17, the initial value+19, the initial value+21, and the initial value+23 the initial value setting field 54 which are input to the first initial value setting field 54 are arranged in an upper stage of the punch block label L1.

In the second initial value setting field 55, an initial value of a lower stage of the punch block label L1 is set. Total 13 numerical values obtained by adding the same numerical values as the upper stage to the initial value input to the second initial value setting field 55 are arranged in the lower stage of the punch block label L1.

In the preview display region E2, a printing image I corresponding to the printing data generated based on the setting value of the setting region E1 is displayed. The printing image I is a display (printing preview display) in which an image of the printing image is superimposed on an image of a tape. The PC control unit 16 determines a display size of the printing image I such that an image of the tape has the maximum size that can fit in the vertical direction of the preview display region E2, according to a tape width displayed in the tape width display and selection field 51.

In addition, after at least the tape width display and selection field 51, the margin length setting field 52, and the label length setting field 53 among the editing items in the setting region E1 are set, the PC control unit 16 displays the printing image I in the preview display region E2. In addition, when in a case where a setting value of any editing item among the editing items in the setting region E1 is altered, the alteration is reflected in the printing image I. The printing image Ic illustrated in FIG. 2 displays a case where the editing items of a "margin length" and a "label length" are both set to default values.

In a case where the print button 41 is selected on the editing screen D1, the PC control unit 16 generates printing data based on setting of the setting region E1 and transmits the printing data to the tape printing apparatus 2. In addition, in a case where the cancel button 42 is selected, the PC control unit 16 cancels the setting of the setting region E1 and hides the editing screen D1.

FIG. 3 illustrates the punch block label L1 created based on the setting of the editing screen D1 (setting region E1) of FIG. 2. As illustrated in FIG. 3, a label length from a front end portion to a rear end portion of the punch block label L1 is 206 [mm], a front margin length from the front end portion to a printing start position of the punch block label L1 is 3 [mm], and a rear margin length from the printing end position to the rear end portion of the punch block label L1 is 3 [mm].

As illustrated in FIG. 2, in a case where the editing items "margin length" and "label length" are all set to default values, the created punch block label L1 has the same appearance as the printing image Ic displayed in the preview display region E2 of FIG. 2. In other words, in a case where at least one of the editing items "margin length" and "label length" are set to a value other than the default values, the created punch block label L1 and the printing image I have different appearances. This is because, in a case where the values of the editing items "margin length" and "label length" are altered to setting values other than the default values (initial values) and the altered values are less than or equal to a threshold value which will be described below, the PC control unit 16 exaggerates the change in the printing image I based on the change and displays the exaggerated changes. Hereinafter, the exaggerated display of the printing image I according to the alteration in the setting values of the editing items "margin length" and "label length" will be described in detail. The editing items "margin length" and "label length" are examples of editing items "a length of the printing image in the longitudinal direction of the printing medium changes due to the alteration in the setting value".

Items other than the editing items "margin length" and "label length" among editing items of the printing data illustrated in the setting region E1 do not become targets of the exaggerated display. That is, in a case where the items other than the editing items "margin length" and "label length" are altered, the alteration is reflected in the printing image I, but the change based on the alteration in the setting value is not exaggeratedly displayed.

FIG. 4 illustrates the setting values and the alteration units of the editing items "margin length" and "label length". As illustrated in FIG. 4, the setting values of the editing item "margin length" can be altered in a range between a lower limit value 1.0 [mm] and an upper limit value 15.0 [mm], and the default value is 3.0 [mm]. In addition, the alteration unit (step) of the setting value of the editing item "margin length" is 1.0 [mm]. That is, two steps can be altered from the default value of 3.0 [mm] to the lower limit value, and 12 steps can be altered from the default value of 3.0 [mm] to the upper limit value.

Meanwhile, the setting value of the editing item "label length" can be altered in a range between the lower limit value 205.0 [mm] and the upper limit value 208.0 [mm], and the default value is 206.0 [mm]. In addition, the alteration unit (step) of the setting value of the editing item "label length" is 0.1 [mm]. That is, 10 steps can be altered from the default value of 206.0 [mm] to the lower limit value, and 20 steps can be altered from the default value of 206.0 [mm] to the upper limit value.

However, in a case where values, which are altered from the default values of each editing items, of the setting value are less than or equal to 5 steps (less than or equal to the above-described "threshold value"), the PC control unit 16 exaggeratedly displays the change in the printing image I of the preview display region E2. Meanwhile, in a case where values, which are altered from the default values of each editing item, of the setting values exceed five steps, the PC control unit 16 displays the printing image I when the altered values are set to five steps. However, if only an alteration of step less than 5 steps can be made in consideration of the lower limit value or the upper limit value of the setting value, the exaggerated display is made in a range of the number of steps that can be altered.

Figure 5:
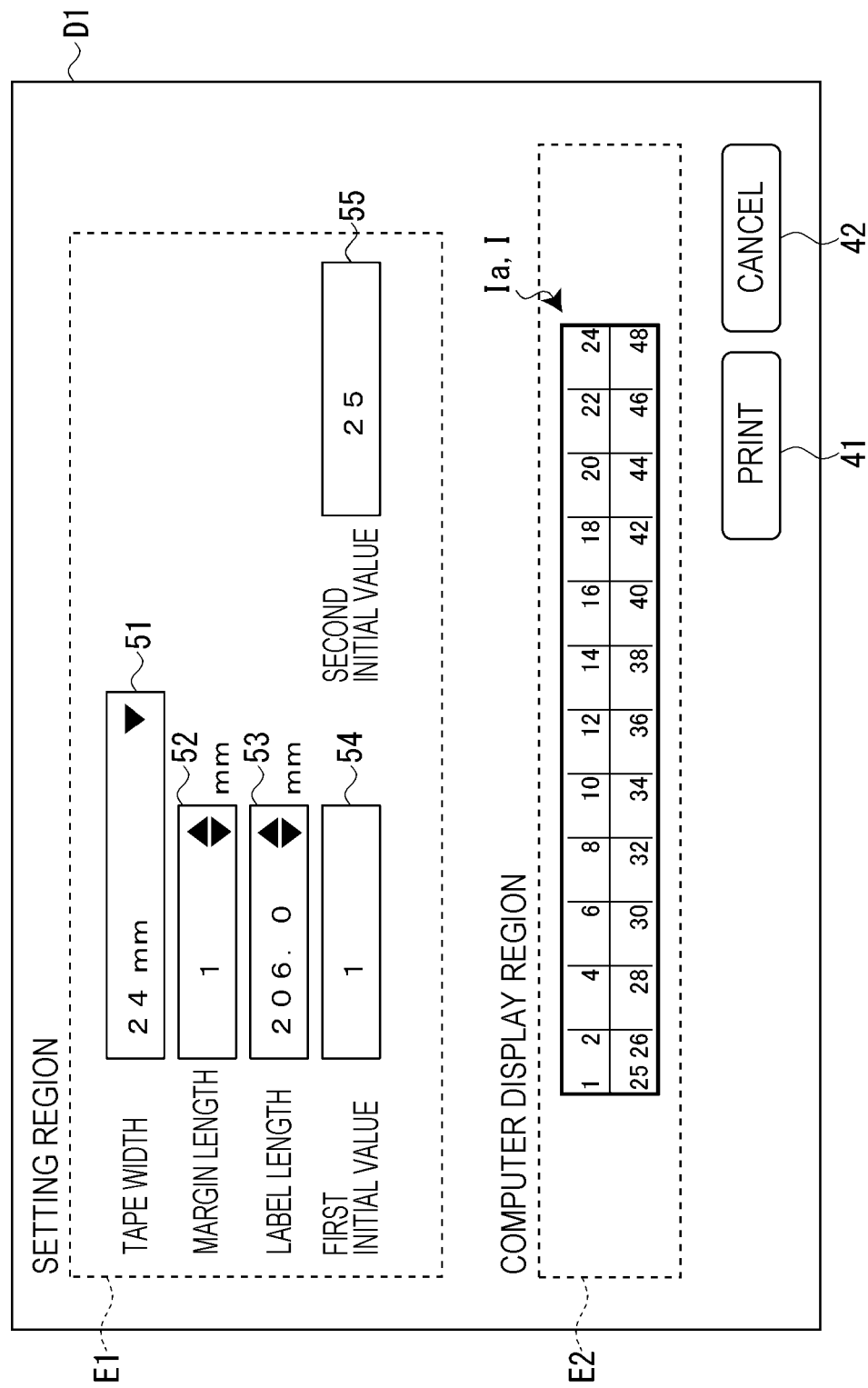
FIG. 5 is a diagram illustrating an example of an editing screen (when a margin length is set to 1 [mm] and a label length is set to 206.0 [mm]).

The editing screen D1 of FIG. 5 illustrates a printing image Ia (see the preview display region E2) in a case where the editing item "margin length" is set to 1 [mm] (lower limit value) (see the margin length setting field 52). Since the default value is 3.0 [mm] and the alteration unit is 1.0 [mm] in the editing item "margin length", setting of the margin length: 1 [mm] is made by altering two steps on a lower limit value side from the default value, and becomes a target of the exaggerated display according to the altered value of the setting value. Thus, the altered values of the front margin length and the rear margin length of the printing image Ia become a value (in a case where the exaggerated display rate is, for example, 1.5 times, 2×1.5=3 [mm]) obtained by multiplying the altered value (here, 2 mm) of the setting value by a predetermined exaggerated display rate, and the front margin length and the rear margin length of the printing image Ia become the default value 3 [mm]–the changed value 3 [mm]=0 [mm]. Here, the "exaggerated display rate" indicates the changed value of the printing image I with respect to the altered value of the setting value from the default value. Since the margin length is shorter in the setting of the editing screen D1 of FIG. 5 than in the setting of the editing screen D1 of FIG. 2, the printing image Ia has a wider numerical interval than the printing image Ic.

Figure 8:
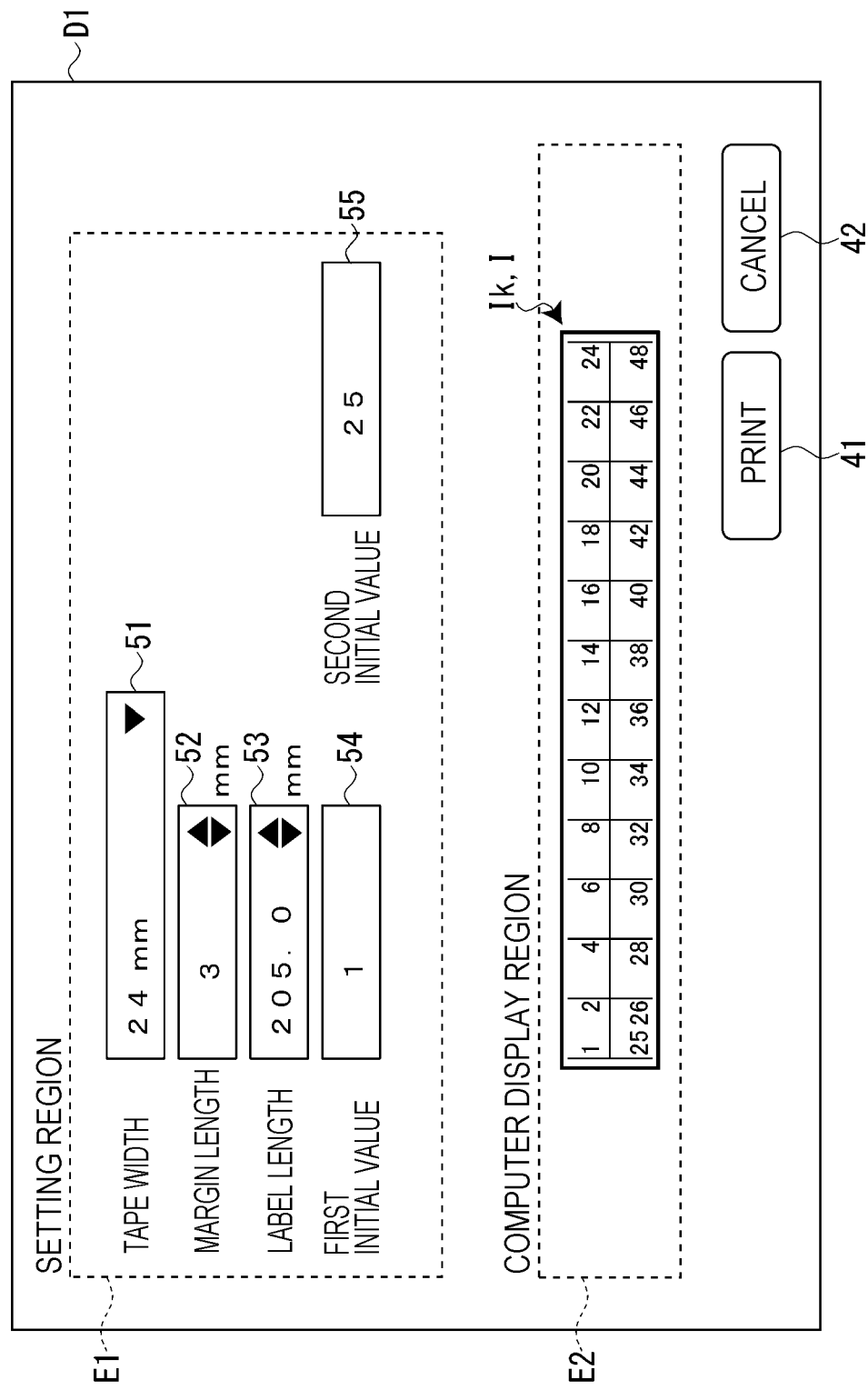
FIG. 8 is a diagram illustrating an example of an editing screen (when a margin length is set to 3 [mm] and a label length is set to 205.0 [mm]).
Figure 9:
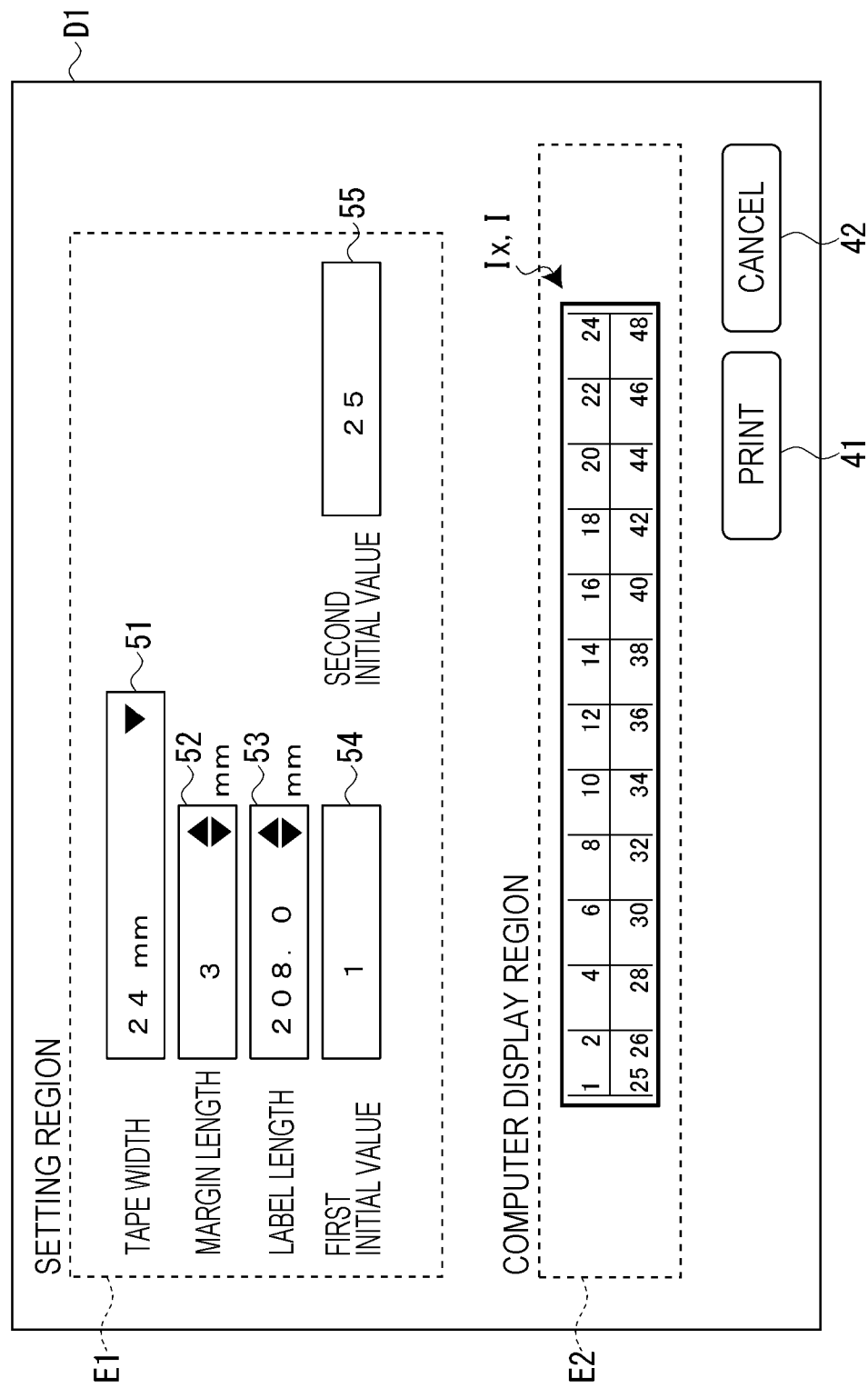
FIG. 9 is a diagram illustrating an example of an editing screen (when a margin length is set to 3 [mm] and a label length is set to 208.0 [mm]).

While not illustrated in particular, printing result based on the editing screen D1 of FIG. 5 differs from the display of the printing image Ia in which the front margin length and the rear margin length are exaggeratedly displayed, and the label L (front margin length: 1 [mm], rear margin length: 1 [mm], label length: 206 [mm]) is created based on the setting value of the setting region E1. Since the printing results based on the editing screen D1 of FIGS. 6, 8, and 9 are also based on the setting value of the setting region E1, the description will be omitted hereinafter.

Figure 6:
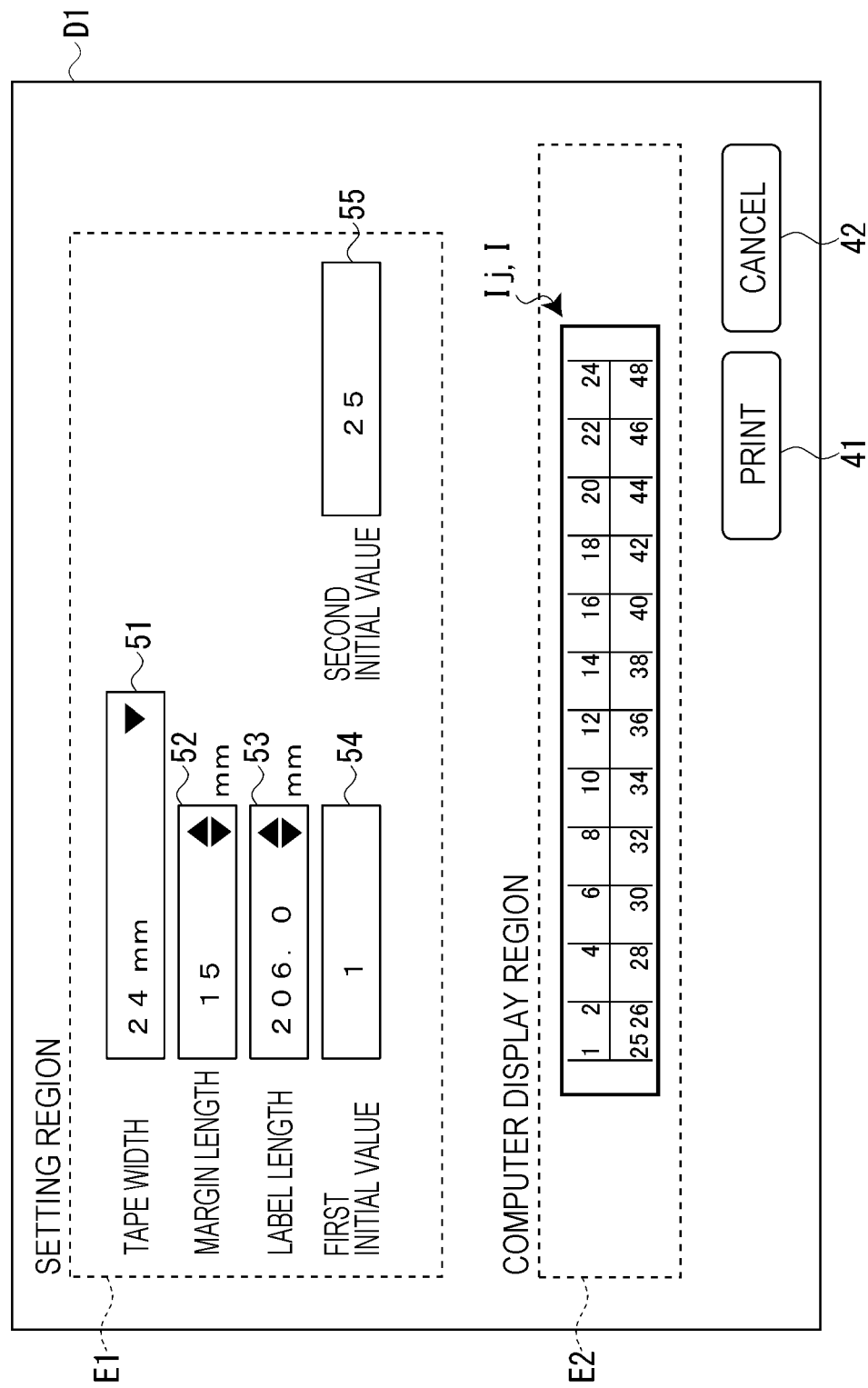
FIG. 6 is a diagram illustrating an example of an editing screen (when a margin length is set to 15 [mm] and a label length is set to 206.0 [mm]).

The editing screen D1 in FIG. 6 illustrates a printing image Ij (see the preview display region E2) in a case where the editing item "margin length" is set to 15 [mm] (upper limit value) (see the margin length setting field 52). Since the setting of the margin length: 15 [mm] is made by altering 12 steps on an upper limit value side from the default value, the setting exceeds a range of the exaggerated display according to the altered value of the setting value. Thus, a front margin length and a rear margin length of the printing image Ij are displayed in the same manner as in a printing image Ih (see FIG. 7) when the margin length: 8 [mm] altered by five steps on the upper limit value side from the default value is set.

Figure 7:
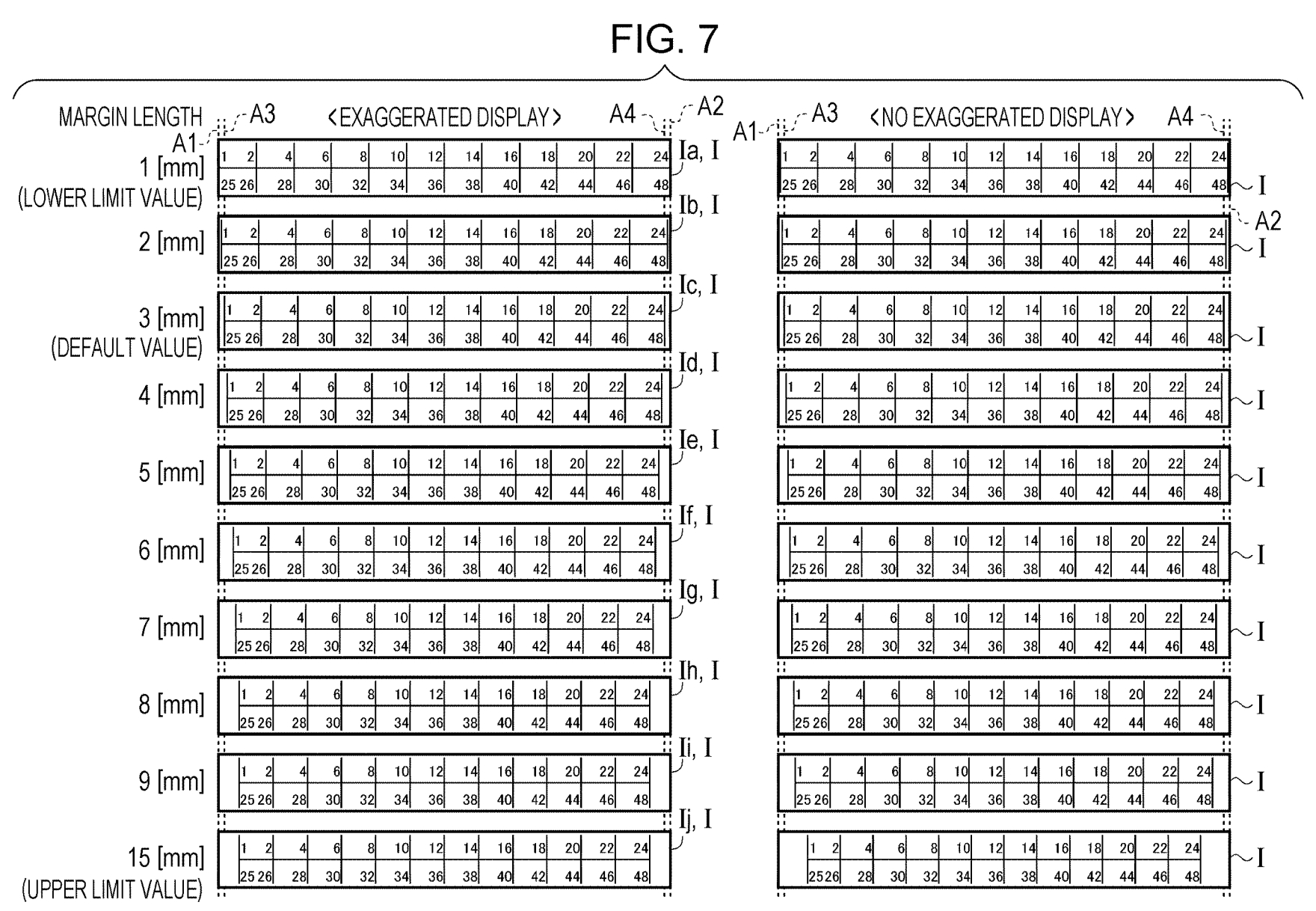

FIG. 7 is a diagram illustrating a change in the printing image I due to the alteration in the margin length. FIG. 7 illustrates a case where the label length is the default value (206.0 [mm]). The left side of FIG. 7 illustrates the printing image I in a case where the exaggerated display is made (in a case where the preview display according to the present embodiment is made), and the right side thereof illustrates the printing image I in a case where no exaggerated display is made (in a case where a normal preview display is made). The printing image I in a case where the exaggerated display is made is illustrated with a ratio (exaggerated display rate) in which the change in the margin length is displayed exaggeratedly by 1.5 times.

In addition, in FIG. 7, an auxiliary line A1 indicates a front end position of the printing image I, and an auxiliary line A2 indicates a rear end position of the printing image I. In addition, an auxiliary line A3 indicates an end position of the front margin in a case where the margin length is the default value (3 [mm]), and an auxiliary line A4 indicates an end position of the rear margin in a case where the margin length is the default value. As illustrated in FIG. 7, when the margin length is set to 1 [mm] and the margin length is set to 2 [mm] (see the printing images Ia and Ib), changes of the front margin length and the rear margin length of the printing image I is exaggeratedly displayed according to the altered value of the setting value. In addition, from the time when the margin length is set to 4 [mm] to the time when the margin length is set to 8 [mm] (see the printing images Id to Ih), the changes in the front margin length and the rear margin length of the printing image I are exaggeratedly displayed according to the altered value of the setting value. Furthermore, since the changes exceed a range of the exaggerated display corresponding to the altered value of the setting value from the time when the margin length is set to 9 [mm] to the time when the margin length is set to 15 [mm] (see the printing images Ii and Ij), the front margin length and the rear margin length of the printing image I have the same length as when the margin length is set to 8 [mm] (see the printing image Ih).

As such, if the setting value in the editing item "margin length" is altered, changes in the front margin length and the rear margin length are exaggeratedly displayed in the printing image I. As illustrated in FIG. 7, the exaggerated display rate of the margin length does not always have a constant value (1.5 times in the example of FIG. 7) and may have a variable value. In this case, it is preferable to reduce the exaggerated display rate as the altered value from the default value increases. According to this configuration, in a case where an operation to gradually increasing the altered value of the setting value is performed, it is possible to more clearly illustrate how the alteration of the setting value is reflected in the printing image I in the first step, and since a gap between the setting value and the printing image I when the altered value increases is suppressed, the sense of discomfort felt by the user can be reduced.

Subsequently, a case where the setting value of the label length is altered will be described. The editing screen D1 of FIG. 8 illustrates a printing image Ik (see the preview display region E2) in a case where the editing item "label length" is set to 205.0 [mm] (lower limit value) (see the margin length setting field 52). Since the default value is 206.0 [mm] and the alteration unit (step) is 0.1 [mm] in the editing item "label length", setting of the label length: 205.0 [mm] is made by altering ten steps on the lower limit value side from the default value, and exceeds the range of the exaggerated display according to the altered value of the setting value. Thus, the label length of the printing image Ik is displayed in the same manner as in a printing image Im (see FIG. 10) at the time of setting the label length: 205.5 [mm] altered by five steps on the lower limit value side from the default value.

In addition, the editing screen D1 of FIG. 9 illustrates a printing image Ix (see the preview display region E2) in a case where the editing item "label length" is set to 208.0 [mm] (upper limit value) (see the margin length setting field 52). The setting of the label length: 208.0 [mm] is made by altering 20 steps on the upper limit value side from the default value, and exceeds a range of the exaggerated display according to the altered value of the setting value. Thus, the front margin length and the rear margin length of the printing image Ix are displayed in the same manner as in the printing image Iv (see FIG. 11) at the time of setting the label length: 206.5 [mm] altered by five steps on the upper limit value side from the default value.

Figure 10:
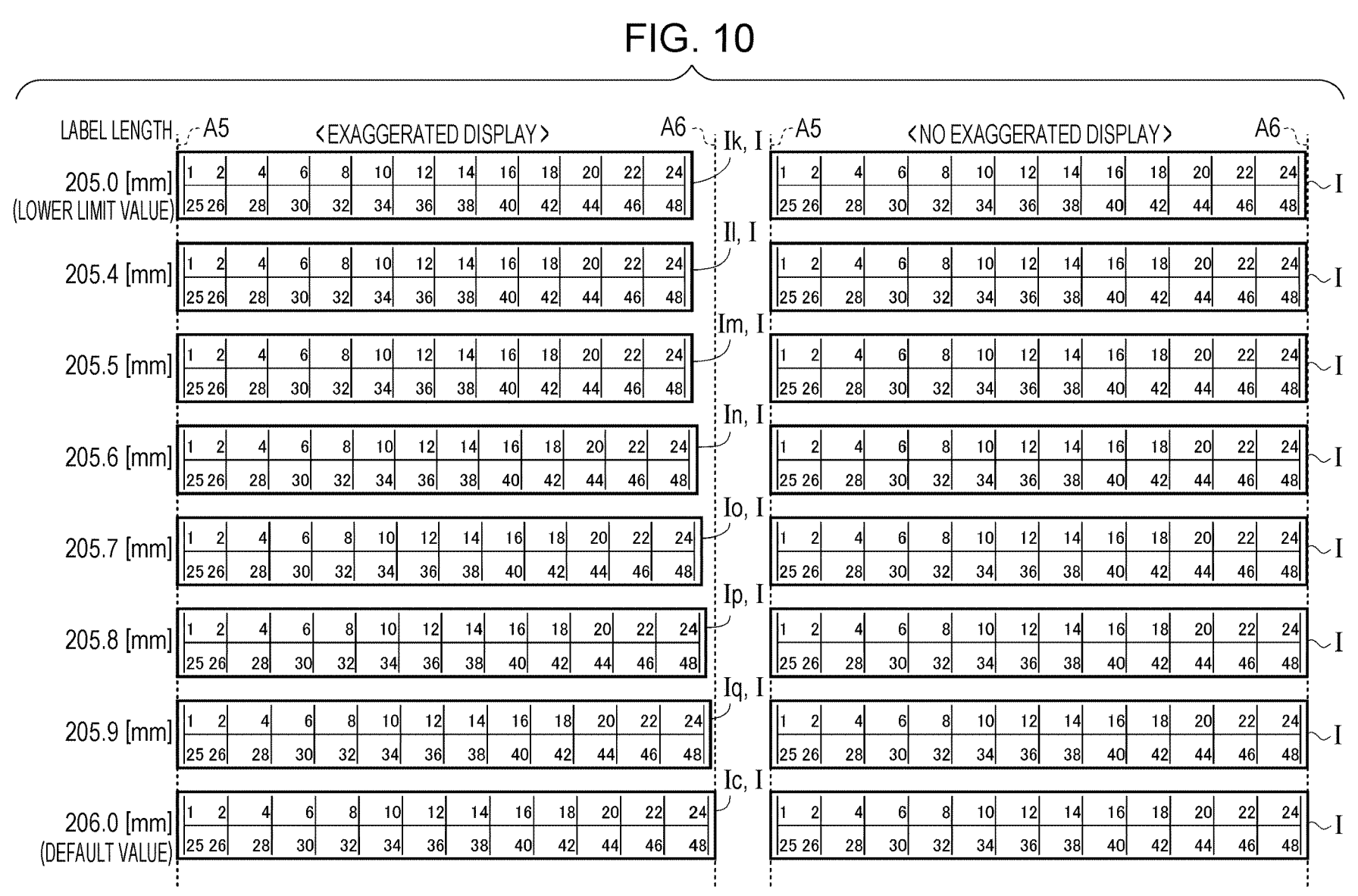
Figure 11:
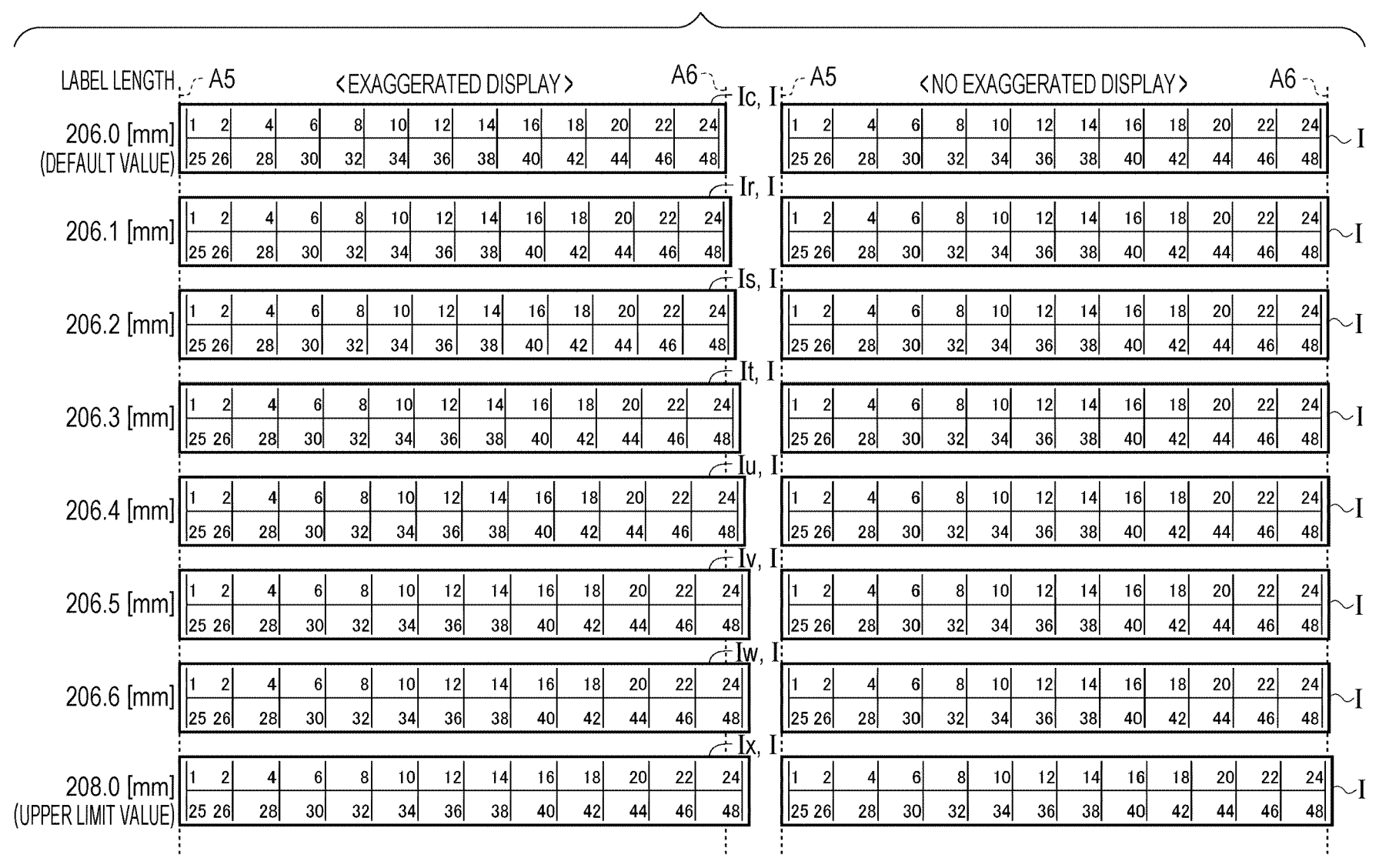

FIGS. 10 and 11 are diagrams illustrating the change of the printing image I due to the alteration of the label length. FIGS. 10 and 11 illustrate a case where the margin length is the default value (3 [mm]). In addition, the left sides of FIGS. 10 and 11 illustrate the printing image I in a case where the exaggerated display is made, and the right sides thereof illustrate the printing image I in a case where the exaggerated display is not made. The printing image I in a case where the exaggerated display is made is illustrated with a ratio (exaggerated display rate) in which the change in the label length is displayed exaggeratedly by 20 times.

In addition, in FIGS. 10 and 11, an auxiliary line A5 indicates the front end position of the printing image I, an auxiliary line A6 indicates a rear end position of the printing image Ic in a case where the label length is the default value (206.0 [mm]). As illustrated in FIG. 10, since the change exceeds a range of the exaggerated display according to the altered value of the setting value from the time when the label length is set to 205.0 [mm] to the time when the label length is set to 205.4 [mm] (see the printing images Ik and Il), the label length of the printing image I has the same length as when the label length is set to 205.5 [mm] (see a printing image Im). In addition, the change in the label length of printing image I is exaggeratedly displayed according to the altered value of the setting value from the time when the label length is set to 205.5 [mm] to the time when the label length is set to 205.9 [mm] (see the printing images Im to Iq). In addition, since the printing image I in this case has a shorter label length than when the label length is set to 206.0 [mm] (see the printing image Ic), a numerical interval is narrowed.

In addition, as illustrated in FIG. 11, the change in the label length of the printing image I is exaggeratedly displayed according to the altered value of the setting value from the time when the label length is set to 206.1 [mm] to the time when the label length is set to 206.5 [mm] (see printing images Ir to Iv). In addition, since the printing image I in this case has a longer label length than when the label length is set to 206.0 [mm] (see printing image Ic), the numerical interval is widened. Furthermore, since the change exceeds a range of the exaggerated display according to the altered value of the setting value from the time when the label length is set to 206.6 [mm] to the time when the label length is set to 208.0 [mm] (see printing images Iw and Ix), the label length of the printing image I has the same length as when the label length is set to 206.5 [mm] (see printing image Iv).

As such, if the setting value in the editing item "label length" is altered, the change in the label length is exaggeratedly displayed according to the altered value of the setting value, in the printing image I. Also in the editing item "label length", the exaggerated display rate may always be a constant value or may be a variable value in the same manner as in the editing item "margin length". In addition, in the latter case, the exaggerated display rate is preferably reduced as the altered value of the default value increases.

As described above, according to a printing system SY according to the present embodiment, the change of the printing image I based on the alteration of the setting value of the editing item is exaggeratedly displayed on the editing screen D1 of the printing data, and thus, how the alteration of the setting value is reflected in the printing image I (what kind of changes are in a certain part of the printing image I) is illustrated such that a user easily knows.

In particular, in a case where the label L to be created is long or in a case where the preview display region E2 is narrow, the change in the printing image I due to the alteration of the setting value is reduced, and thus, there is a problem in which a user hardly confirms that the setting values of the editing items "margin length" and "label length" are changed. In the present embodiment, such a problem can be solved by exaggeratedly displaying the change based on the alteration of the setting value in the editing items.

In addition, in the printing system SY according to the present embodiment, in a case where the altered value of the setting value from the default value of the editing item is less than or equal to five steps, the change of the printing image I is exaggeratedly displayed according to the altered value of the setting value, and in a case where the altered value of the setting value exceeds five steps, printing image I when setting value is set to 5 steps is displayed. That is, in a case where the altered value of the setting value is less than or equal to the threshold value, a user is hardly aware of the change. Accordingly, by exaggeratedly displaying the change based on the alteration of the setting value, how the alteration of the setting value is reflected in the printing image I can be illustrated such that the user easily knows. Meanwhile, in a case where the altered value of the setting value exceeds the threshold value, the printing image I when the setting value is set to the threshold value is displayed, and thus, it is possible to prevent appearances of the printing image I and the label L from becoming different from each other.

In addition, in the printing system SY according to the present embodiment, there are a plurality of editing items to be exaggeratedly displayed, and the alteration unit of the setting value is determined for each editing item, and thus, a user can perform editing using an alteration proper for each editing item. In addition, Further, since the threshold value is determined by the same number of change steps for a plurality of editing items, in a case where the setting value is altered to some extent, the user can confirm the printing image I after understanding that the altered place is exaggeratedly displayed.

The invention is not limited to the above-described embodiment, and the following modifications can be adopted.

First Modification Example

In the above embodiment, the PC control unit 16 exaggeratedly displays the change of the printing image I in accordance with the change of the setting values of the editing items "margin length" and "label length", but even in a case where the setting value of a character decoration is altered, the change of the printing image I due to the alteration may be exaggeratedly displayed.

Figure 12:
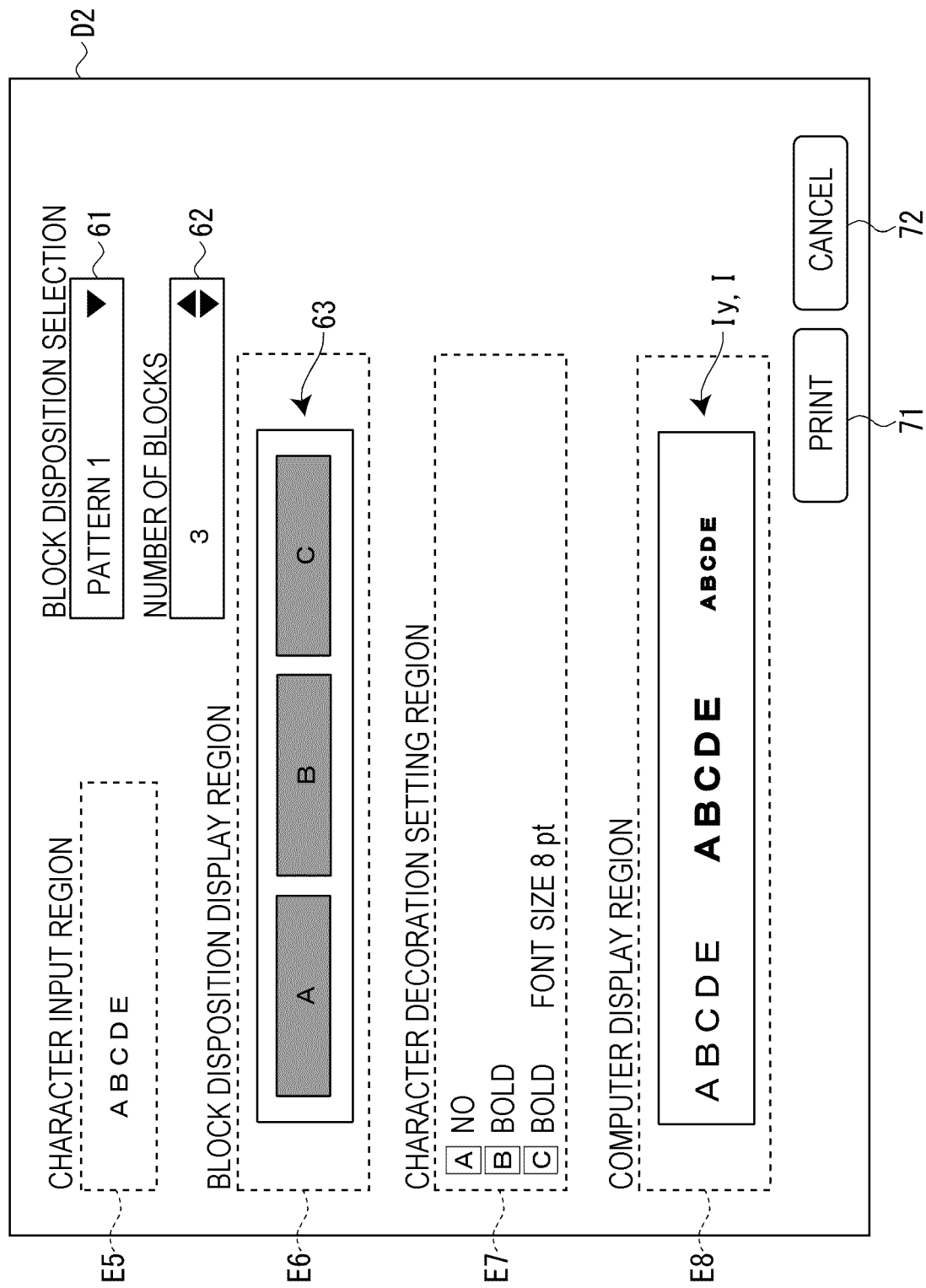
FIG. 12 is a diagram illustrating an example of an editing screen according to a first modification example.

FIG. 12 is a diagram illustrating an example of an editing screen D2 according to a first modification example. The editing screen D2 includes a character input region E5, a block disposition selection field 61, a block number setting field 62, a block disposition display region E6, a character decoration setting region E7, a preview display region E8, a print button 71, and a cancel button 72. The print button 71 and the cancel button 72 function in the same manner as the print button 41 and the cancel button 42 (see FIG. 2 and the like) on the editing screen D1.

Characters (including numerals and symbols) are input to the character input region E5. One of a plurality of block disposition patterns is selected in the block disposition selection field 61. "Pattern 1" for disposing a plurality of blocks in the longitudinal direction of a tape, "pattern 2" for disposing a plurality of blocks in the width direction of the tape, "pattern 3" for disposing a plurality of blocks in the longitudinal direction and the width direction of the tape, and the like can be selected as the block disposition patterns. In the block number setting field 62, the number of blocks to be disposed can be set. The block disposition display region E6 displays the block disposition image 63, based on the settings of the block disposition selection field 61 and the block number setting field 62. In the character decoration setting region E7, s character decoration is set for each block. In the example of FIG. 12, there are three blocks, and thereby, the character decoration is set for each of the A, B, and C blocks. The printing image Iy corresponding to the printing data based on the settings of the character input region E5, the block disposition selection field 61, the block number setting field 62, and the character decoration setting region E7 is displayed in the preview display region E8.

Figure 13:
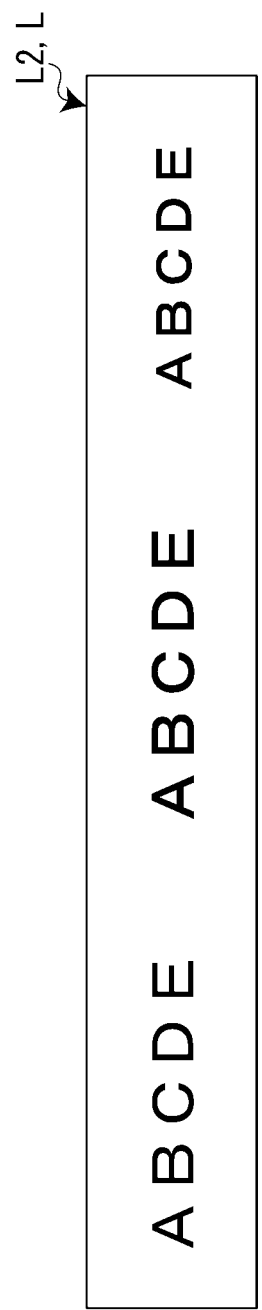
FIG. 13 is a diagram illustrating a creation example of a character label according to the first modification example.

FIG. 13 illustrates a character label L2 created based on the setting of the editing screen D2 in FIG. 12. The character label L2 is set such that an A block which is a first block has a character decoration "no", a B block which is a second block has a character decoration "bold character", a C block which is a third block has a character decoration "bold character" and "font size of 8 points", based on the setting of the character decoration setting region E7. It is assumed that the default value of the font size is 10 points. With respect to the character label L2, the character decorations of the B block and the C block are exaggeratedly displayed in the printing image Iy (see the preview display region E8) illustrated in the editing screen D2 of FIG. 12. That is, the PC control unit 16 exaggeratedly displays the printing image such that the character becomes bolder for the character decoration "bold character" and such that a font size becomes smaller for the character decoration "font size" as compared with a case where there are no exaggerated displays.

As such, when the setting value of the character decoration is altered as the editing item of the printing data, the PC control unit 16 exaggeratedly displays the change in the character decoration of the printing image I corresponding to the printing data. According to the configuration, in a case where the character decoration is altered, how the alteration is reflected in the printing image I can be illustrated such that a user easily knows.

In addition to the bold character and the font size illustrated in FIG. 12, in a case where character formatting such as italics, a shaded character, a stereoscopic character, and a character with edge is altered as the character decoration, a change based on the alteration may be exaggeratedly displayed. It is considered that, for example, a slope of a character increases in a case where a character decoration is "italics", the amount of shadow increases in a case where the character decoration is a "shaded character", a stereoscopic effect increase in a case where the character decoration is a "three-dimensional character", the amount of edges increases in a case where the character decoration is a "character with edge", and the like, as an exaggerated display method.

Second Modification Example

Figure 14:
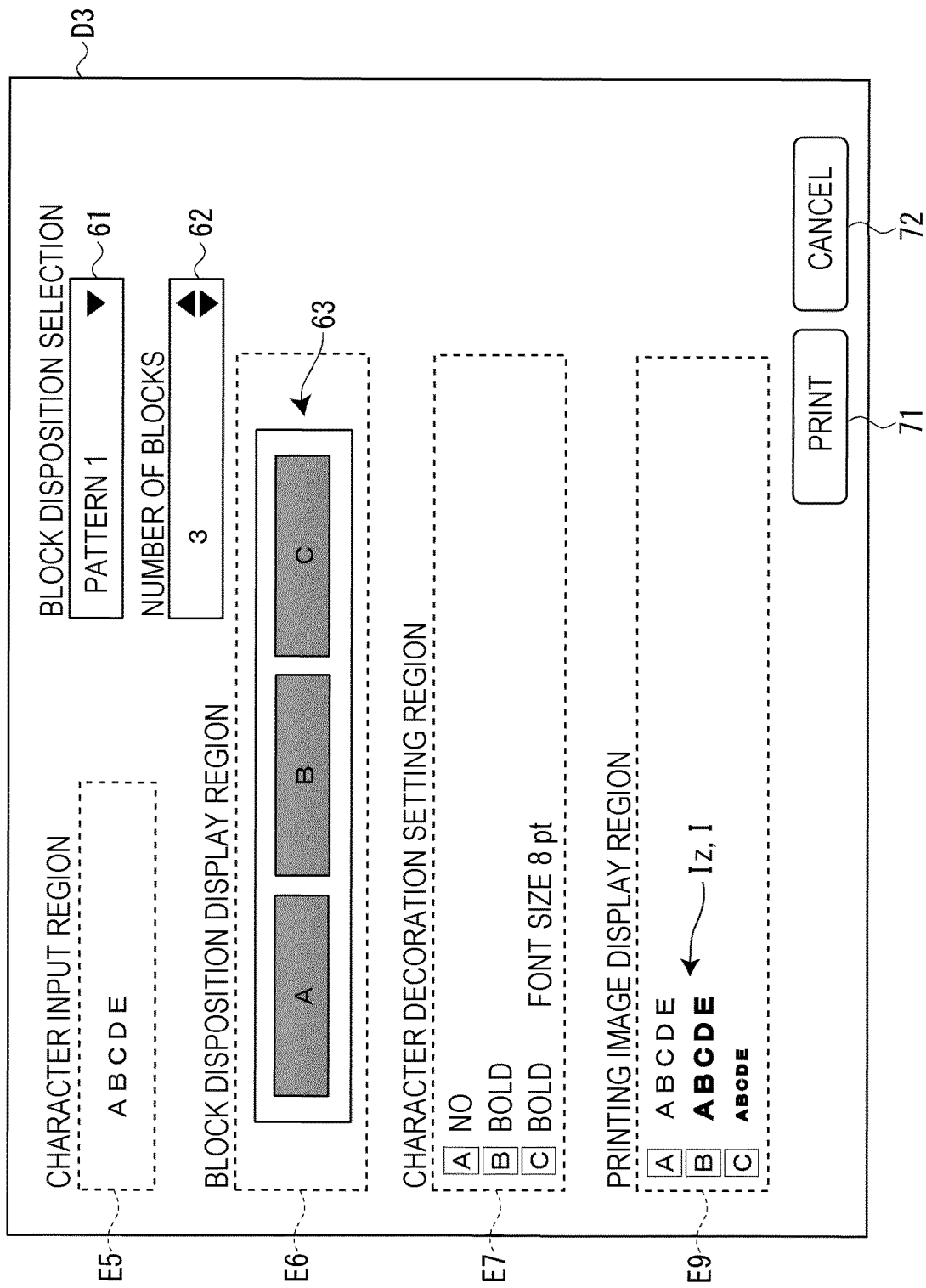
FIG. 14 is a diagram illustrating an example of an editing screen according to a second modification example.

In addition, in the example of FIG. 12, the PC control unit 16 displays the printing image Iy in which an image of a tape and an image of the printing image are superimposed and displayed (see the preview display region E8), but only the image of the printing image may be displayed as illustrated in an editing screen D3 of FIG. 14. In an example of FIG. 14, a printing image Iz displaying the image of the printing image for each block is displayed in the printing image display region E9. The PC control unit 16 causes the exaggerated display to be made such that a character in the B block in which the character decoration is set to a "bold character" becomes bolder and a character in the C block in which the character decoration is set to a "bold character" and a "font size of 8 points" becomes bolder and smaller, compared with a case where no exaggerated display is made, in the printing image Iz.

In addition, an image of the printing image may be displayed without being divided into blocks as an additional modification example. That is, an image corresponding to the printing image of the character label L2 illustrated in FIG. 13 may be displayed in the printing image display region E9.

Third Modification Example

In the above-described embodiment, in a case where the altered value of the setting value from the default value of the editing item is less than or equal to the threshold value, the PC control unit 16 exaggeratedly displays the change in the printing image I based on the alteration of the setting value, but may exaggeratedly display the change in a case where the altered value of the setting value from a previous setting value (the setting value in the most recent editing processing) is less than or equal to the threshold value, instead of the default value. In this case, if the altered value of the setting value from the previous setting value is less than or equal to the threshold value, the PC control unit 16 exaggeratedly displays the change based on the alteration of the setting value in the printing image I, and if the altered value exceeds the threshold value, the PC control unit 16 displays the printing image I when the setting value is set to the threshold value.

Fourth Modification Example

In the above-described embodiment, in a case where the altered value of the setting value from the default value of the editing item is less than or equal to five steps, the PC control unit 16 exaggeratedly displays the change of the printing image I based on the alteration of the setting value, and the number of steps to become the threshold value is random, and a user may alter the number of steps to a certain value.

Fifth Modification Example

In addition, it may be determined whether or not an exaggerated display is made by using an alteration length as a threshold value instead of the number of alteration steps. In this case, in a case where altered values of the editing items "margin length" and "label length" are less than or equal to, for example, 5 [mm], the PC control unit 16 exaggeratedly displays a change in the printing image I according to the altered values of the setting value, and in a case where the altered values exceed 5 [mm], the PC control unit 16 displays the printing image I when the setting value is set as the threshold value.

As an additional modification example, the threshold value of the altered value of the setting value may be set for each editing item. In addition, a user may be able to alter the threshold value of the altered value to a certain value for each editing item. Furthermore, the user may be able to alter a default value, a lower limit value, an upper limit value, and an alteration unit of the setting value to a certain value for each editing item.

Sixth Modification Example

In the above-described embodiment, in a case where the altered value of the setting value from the default value of the editing item exceeds the threshold value, the PC control unit 16 displays the printing image I when the setting value is set as the threshold value, but in a case where the altered value of the setting value exceeds the threshold value, the PC control unit 16 may display the printing image I of the setting value as it is. In this case, for example, in a case where the default value of the editing item "margin length" is 3 [mm] and the threshold value is 8 [mm] and an exaggerated display rate is twice (always a constant value), when the margin lengths are 3, 4, 5, 6, 7, 8 [mm], the margin lengths of the printing image I are displayed as images of 6, 8, 10, 12, 14, 16 [mm], respectively. In a case where the setting value of the margin length is 9 [mm], the margin length of the printing image I is displayed as an image of 9 [mm].

Seventh Modification Example

In the above-described embodiment, the "margin length" and the "label length" are exemplified as editing items of which length of a tape of the printing image in the longitudinal direction changes due to alteration of the setting value. However, besides this, for example, the exaggerated display may be made even in a case where setting values for editing items such as "font size" and "character space" are altered. In addition, in a case where characters are not aligned horizontally (see FIG. 13) but are aligned vertically (direction in which characters are aligned in a width direction of the label L), the editing items "font size" and "space between rows" may also be displayed exaggeratedly. Furthermore, an editing item of which length of the tape of the printing image in the width direction changes due to an alteration of the setting value may be exaggeratedly displayed. For example, an editing item "tape width", a "margin length" in the width direction of the tape, a "font size", a "space between rows" in a case where characters are aligned horizontally, and a "character space" in a case where the characters are aligned vertically are considered.

Eighth Modification Example

A program (the dedicated application 14b) for the PC control unit 16 (the CPU 16a) to perform each processing of the PC1 described in the above embodiment and the modification examples, and a recording medium (a CD-ROM, a flash memory card, or the like) in which the program is recorded are also included in the scope of the invention. In addition, each processing of the PC1 described in the above embodiment and modification examples may be realized by cloud computing. In addition, an information processing terminal such as a tablet terminal including a display with a touch sensor, or a cellular phone may be used instead of the PC1. Furthermore, each function and a hardware configuration of the PC1 may be included in the tape printing apparatus 2. That is, an information processing terminal other than the PC1 or the tape printing apparatus 2 may be used as the "display control apparatus" of the invention. Besides, appropriate modification may be made within a range without departing from the gist of the invention.

This application claims priority under 35 U.S.C. § 119 to Japanese Patent Application No. 2017-126642, filed Jun. 28, 2017. The entire disclosure of Japanese Patent Application No. 2017-126642 is hereby incorporated herein by reference.

What is claimed is:

1. A display control apparatus comprising:
a control unit that exaggeratedly displays a change in a printing image based on an alteration in a setting value of an editing item, on a display, when editing results of printing data on an editing screen are displayed on the display as the printing image and the setting value of the editing item of the printing data is altered,
wherein the control unit exaggeratedly displays the change in the printing image, according to an altered value of the setting value from a default value or a previous setting value of the editing item, in response to determining that the altered value of the setting value is less than or equal to a threshold value.

2. The display control apparatus according to claim 1,
wherein the control unit displays the printing image in a preview display region of the editing screen that is displayed on the display.

3. The display control apparatus according to claim 1,
wherein the printing data is used for performing printing on a long printing medium, and
wherein, in the editing item, a length of the printing image in a longitudinal direction of the printing medium is changed due to the alteration in the setting value.

4. The display control apparatus according to claim 1,
wherein, in the editing item, a character decoration of the printing image is changed due to the alteration in the setting value.

5. The display control apparatus according to claim 1,
wherein the control unit displays the printing image when the setting value is set to the threshold value, in response to determining that the altered value exceeds the threshold value.

6. The display control apparatus according to claim 5,
wherein there are a plurality of the editing items,
wherein an alteration unit of the setting value is determined for each editing item, and
wherein the threshold value is determined by the same number of alteration steps for the plurality of editing items.

7. A printing apparatus comprising:
a display that displays editing results of printing data on an editing screen of the printing data as a printing image;
a control unit that exaggeratedly displays a change in the printing image based on an alteration in a setting value of an editing item on the display, when the setting value of the editing item of the printing data is altered; and
a printing unit that performs printing on a printing medium, based on the printing data,
wherein the control unit exaggeratedly displays the change in the printing image, according to an altered value of the setting value from a default value or a previous setting value of the editing item, in response to determining that the altered value of the setting value is less than or equal to a threshold value.

8. A control method of a display control apparatus comprising:
exaggeratedly displaying a change in a printing image based on an alteration in a setting value of an editing item, on a display, when editing results of printing data on an editing screen are displayed on the display as the printing image and the setting value of the editing item of the printing data is altered,
wherein the exaggeratedly displaying the change includes exaggeratedly displaying the change in the printing image, according to an altered value of the setting value from a default value or a previous setting value of the editing item, in response to determining that the altered value of the setting value is less than or equal to a threshold value.

9. A non-transitory tangible computer-readable medium for storing a program which, when executed by a computer, causes the computer to perform the control method of the display control apparatus according to claim 8.

* * * * *